W. R. UHLEMANN.
EYEGLASS MOUNTING.
APPLICATION FILED MAR. 29, 1909.
970,577.
Patented Sept. 20, 1910.
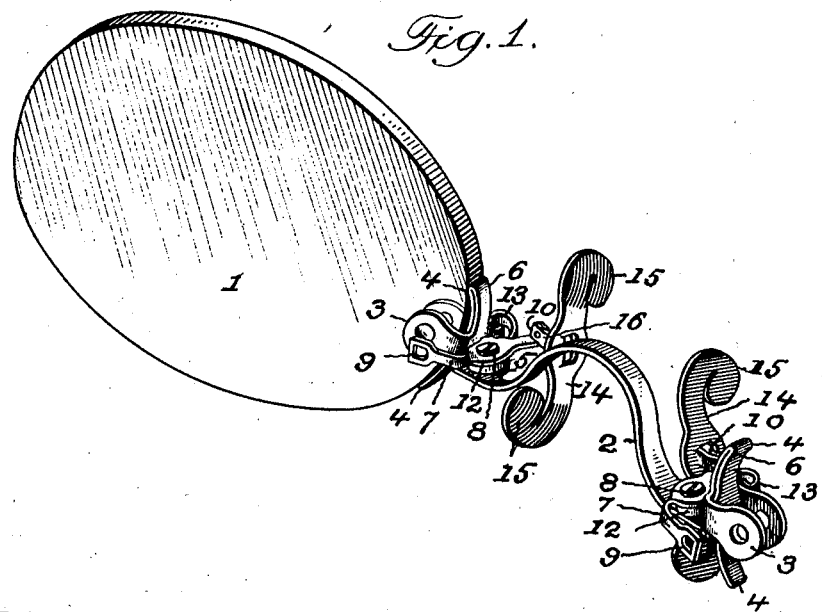
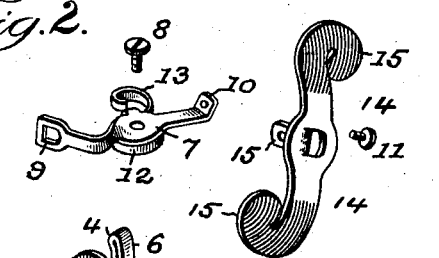
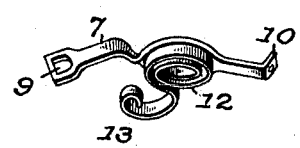
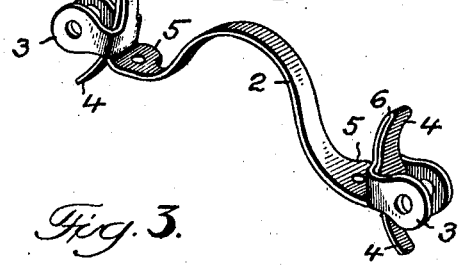
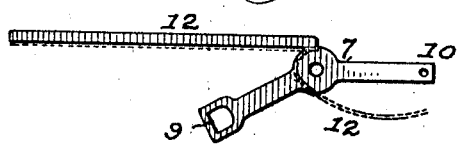
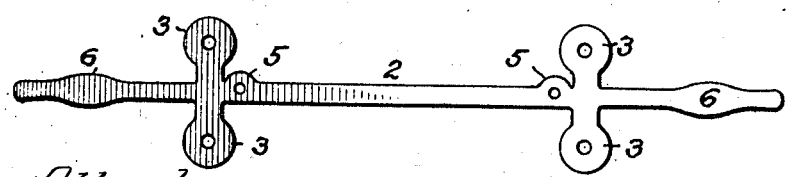
Attest:
John Enders,
Richard H. Uhlemann.
Inventor:
William R. Uhlemann,
by Robert Burns
Attorney

UNITED STATES PATENT OFFICE.

WILLIAM R. UHLEMANN, OF CHICAGO, ILLINOIS.

EYEGLASS-MOUNTING.

970,577.  Specification of Letters Patent.  Patented Sept. 20, 1910.

Application filed March 29, 1909. Serial No. 486,485.

*To all whom it may concern:*

Be it known that I, WILLIAM R. UHLEMANN, a citizen of the United States of America, and a resident of Chicago, in the county of Cook and State of Illinois, have invented certain new and useful Improvements in Eyeglass-Mountings, of which the following is a specification.

This invention relates to that class of eyeglass mountings known as finger piece mountings, and in which the lenses are carried by a rigid bridge to which in turn are pivotally connected the respective nose grips by which the eyeglasses are supported in place on the nose of the wearer. And the present improvement has for its object, to provide a simple and efficient formation and arrangement of the manually operated nose grip, carrying lever, holding spring and pivotal bearing on the bridge, adapted to afford an economical and compact construction, and a ready means for adjusting the tension of the spring to any ordinary requirement, all as will hereinafter more fully appear.

In the accompanying drawings:—Figure 1, is a perspective view of an eyeglass mounting, the lens to the right being removed to better illustrate the details of construction of the present invention. Fig. 2, is a perspective view of the arched bridge and attaching clips, the nose piece or grip, the carrying lever therefor and the pivot screws, in a detached condition. Fig. 3, is a plan view of the blank from which the integrally connected bridge, attaching clips, resilient prongs and pivot ears of the present mounting are formed. Fig. 4, is an under perspective view of the nose grip carrying lever and its attached operating spring. Fig. 5 is a similar view of the blank from which the integrally connected lever and spring are formed.

Similar numerals of reference indicate like parts in the several views.

Referring to the drawings, 1 represents a lens of a rimless eyeglass, and 2 the rigid arched bridge connecting a pair of lenses together in proper spaced relation and to this end said bridge is provided with attaching clips 3, and bracing members 4 by which the attachment of the parts is effected in a substantial manner. In the construction shown the rigid bridge 2 with its clips or straps 3 and bracing prongs 4, as well as the orificed enlargements 5 for the pivotal attachment of the levers hereinafter described, are integrally formed from a single blank or stamping of the flat form shown in Fig. 6, and subsequently bent and otherwise manipulated to form the finished mounting illustrated in Figs. 1 and 2, the purpose being to provide economy in manufacture, but more especially to preserve the original resiliency of the material, and which is more or less affected by the heat when more or less of the above enumerated parts are formed separately and assembled by the usual brazing operation.

6 are resilient tongues attached at one end to the heel portions of the aforesaid clips 3, and bent upon themselves, as shown in Figs. 1, 2, and 3, to form crescent shaped members which have symmetrical relation at the upper and under sides of the clips and constitute the before mentioned bearing prongs 4, and which as so formed have a resilient nature that permits of a limited independent movement between the lens and clips, adapted to prevent in a very effective manner the danger of an accidental breakage of the lens.

The above described formation of the resilient tongues 6, constitutes the subject matter of my divisional application for patent, Serial No. 499,245, filed May 29, 1909.

7 are the carrying levers of the nose pieces or grips hereinafter described. Said levers are pivoted about midway of their length to the enlargements 5 near the base of the connecting bridge 2, by pivot screws 8; and are formed with outwardly curved forward arms ending in expanded finger pieces 9 of substantially U form as shown. The inner arms of said levers are of a substantially straight form and have upturned and orificed ears 10 to which the before mentioned nose pieces or grips are pivotally attached by a rivet or screw 11 as shown.

In the present invention 12 is a volute spring coiled in volute relation to the pivot axis of a lever 7 and forming an integral part thereof. Said spring has a loop shaped free arm 13 adapted to bear against the inner side of an adjacent clip or strap 3, as shown, with a constant tendency on the part of the spring to force the inner end of the lever, and the nose grip carried thereby toward the nose of the wearer and attain the desired holding effect. In the manufacture of the aforesaid lever and spring, the same will be formed from a flat blank or stamping of the form shown in Fig. 5, and subsequently bent and otherwise manipulated to form the combined lever and spring illustrated in Figs. 1, 2 and 4.

The loop form of the spring end 13, above described, affords a ready and convenient means for increasing or diminishing the tension of the spring by a slight coiling and uncoiling of the loop in one direction or the other on the part of the optician or user.

In the aforesaid adjustment of the tension of the springs to suit the special requirements of each individual use, the flat ribbon form of spring is a material and necessary feature in the present improvement, in that it provides the necessary lateral rigidity to the aforesaid looped end portions 13 to very effectively resist the liability of said looped end portions of the springs to turn laterally under the normal resilient stress of the springs and become practically inoperative. This would be a common occurrence with the looped end portions 13 formed at the extended ends of fine round wire springs ordinarily used in eyeglass mountings of the present type.

14 are the nose pieces or grips, preferably of the form shown in Figs. 1 and 2 of the drawing, and comprising a main middle portion curved in reversed directions and ending in return bends 15, the ends of which are of a lobular form and arranged at opposite sides of the main portion as shown. No claim is however made to such particular form of nose grip in the present application, as such form of nose grip constitutes a portion of the subject matter of a separate application for Letters Patent, Serial Number 500,413, filed June 5, 1909.

16 is a pivot tongue on the nose piece or grip, by which said grip is pivotally secured to the end of the lever 7 by the screw 11 before described.

Having thus fully described my said invention what I claim as new and desire to secure by Letters Patent, is:

1. In a finger piece eyeglass mounting, the combination of a rigid arched bridge, pivot eyes at the base of said bridge, attaching clips adjacent to said pivot eyes, nose grip carrying levers pivoted to said pivot eyes, and operating springs of a flat ribbon form encircling the pivot axis of the carrying levers and connected thereto at their inner ends, the outer ends of said springs having rearward extensions which bear against the rear faces of the clips aforesaid in a plane parallel with the rear faces of the lenses, substantially as set forth.

2. In a finger piece eyeglass mounting, the combination of a rigid arched bridge, pivot eyes at the base of said bridge, attaching clips adjacent to said pivot eyes, nose grip carrying levers pivoted to said pivot eyes, and operating springs of a flat ribbon form encircling the pivot axis of the carrying levers and connected thereto at their inner ends, the outer ends of said springs having rearward extensions in the form of curved loops which bear against the rear faces of the clips aforesaid in a plane parallel with the rear faces of the lenses, substantially as set forth.

3. In a finger piece eyeglass mounting, the combination of a rigid arched bridge, pivot eyes at the base of said bridge attaching clips adjacent to said pivot eyes, nose grip carrying levers pivoted to said pivot eyes, and operating springs of a flat ribbon form attached to said levers and bent into a volute form beneath the levers and around the pivot axis of the same, the outer ends of said springs having rearward extensions which bear against the rear faces of the clips aforesaid in a plane parallel with the rear faces of the lenses, substantially as set forth.

4. In a finger piece eyeglass mounting, the combination of a rigid arched bridge, pivot eyes at the base of said bridge attaching clips adjacent to said pivot eyes, nose grip carrying levers pivoted to said pivot eyes, and operating springs of a flat ribbon form attached to said levers and bent into a volute form beneath the levers and around the pivot axis of the same, the outer ends of said springs having rearward extensions in the form of curved loops which bear against the rear faces of the clips aforesaid in a plane parallel with the rear faces of the lenses, substantially as set forth.

5. In a lens mounting of the type herein described, the combination of a rigid arched bridge, a pair of levers pivoted thereon at opposite sides of the arch of the bridge, and nose grips pivotally connected to the inner ends of said levers by a pivot tongue formed by a U shaped slit in the central part of the grip to form the tongue and which is bent to the proper angular relation to body of the grip, substantially as set forth.

Signed at Chicago, Illinois, this 26th day of March 1909.

WILLIAM R. UHLEMANN.

Witnesses:
RICHARD H. UHLEMANN,
JOHN H. DONOVAN.